US011210388B2

(12) United States Patent
Altenhofen et al.

(10) Patent No.: US 11,210,388 B2
(45) Date of Patent: Dec. 28, 2021

(54) AUTOMATED ACCESS DATA CHANGE DETECTION

(71) Applicant: Visa International Service Association, San Francisco, CA (US)

(72) Inventors: Meredith Altenhofen, San Francisco, CA (US); Amy Alterman, San Francisco, CA (US); Robert Yost, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 285 days.

(21) Appl. No.: 16/316,485

(22) PCT Filed: Aug. 9, 2017

(86) PCT No.: PCT/US2017/046135
§ 371 (c)(1),
(2) Date: Jan. 9, 2019

(87) PCT Pub. No.: WO2018/034912
PCT Pub. Date: Feb. 22, 2018

(65) Prior Publication Data
US 2019/0303560 A1    Oct. 3, 2019

Related U.S. Application Data

(60) Provisional application No. 62/377,463, filed on Aug. 19, 2016.

(51) Int. Cl.
*G06F 21/45* (2013.01)
*G06F 21/31* (2013.01)
*G06F 21/60* (2013.01)

(52) U.S. Cl.
CPC ............ *G06F 21/45* (2013.01); *G06F 21/31* (2013.01); *G06F 21/60* (2013.01); *G06F 2221/2141* (2013.01)

(58) Field of Classification Search
CPC ......... G06F 21/45; G06F 21/31; G06F 21/60; G06F 2221/2141
See application file for complete search history.

(56) References Cited

U.S. PATENT DOCUMENTS 6,820,204 B1 * 11/2004 Desai .................... G06F 16/256
726/6
7,904,389 B2    3/2011 DiGioacchino
(Continued)

FOREIGN PATENT DOCUMENTS

WO    2015200113 A1    12/2015

OTHER PUBLICATIONS

SG11201900316V, "Written Opinion", dated Mar. 31, 2020, 6 pages.
International Search Report and Written Opinion, dated Nov. 17, 2017, in PCT Application No. PCT/US2017/046135, 13 pages.

*Primary Examiner* — Vu V Tran
(74) *Attorney, Agent, or Firm* — Kilpatrick Townsend & Stockton LLP

(57) ABSTRACT

A user may conduct a plurality of access requests with a plurality of resource provider computers. A processor server computer may determine whether resource provider computers store access data associated with the user in various ways, including detecting patterns in sets of a plurality of access requests conducted between the user and each of the plurality of resource provider computers. Upon detecting that access data has changed, the processor server computer may automatically send the updated access data to each of the identified resource provider computer.

18 Claims, 5 Drawing Sheets

(56) References Cited

U.S. PATENT DOCUMENTS

| | | | |
|---|---|---|---|
| 7,925,587 B2 | 4/2011 | DiGioacchino | |
| 7,966,257 B2 | 6/2011 | DiGioacchino | |
| 8,095,464 B2 | 1/2012 | Patterson et al. | |
| 8,255,327 B2 | 8/2012 | Kemper et al. | |
| 8,290,865 B2 | 10/2012 | Lawrence et al. | |
| 8,706,622 B2 | 4/2014 | Winters et al. | |
| 9,547,864 B2 | 1/2017 | Howe | |
| 9,727,863 B2 | 4/2017 | DiGioacchino | |
| 9,727,858 B2 | 8/2017 | Anderson et al. | |
| 10,943,217 B1* | 3/2021 | Rozin | G06Q 20/108 |
| 2005/0060412 A1* | 3/2005 | Chebolu | G06F 9/44505 |
| | | | 709/227 |
| 2007/0011616 A1 | 1/2007 | Ording et al. | |
| 2009/0064290 A1* | 3/2009 | Norman | G06F 21/31 |
| | | | 726/5 |
| 2010/0228671 A1 | 9/2010 | Patterson | |
| 2013/0232044 A9 | 9/2013 | Waters et al. | |
| 2014/0222594 A1 | 8/2014 | Rose et al. | |
| 2014/0244482 A1* | 8/2014 | Joa | G06Q 10/10 |
| | | | 705/39 |
| 2016/0125405 A1 | 5/2016 | Alterman et al. | |
| 2017/0109745 A1 | 4/2017 | Al-Bedaiwi et al. | |
| 2017/0139973 A1* | 5/2017 | Huang | H04W 4/21 |
| 2018/0322489 A1 | 11/2018 | Altenhofen et al. | |

\* cited by examiner

AUTOMATED ACCESS DATA CHANGE DETECTION

CROSS-REFERENCES TO RELATED APPLICATIONS

This application is the U.S. National Phase of PCT Application No. PCT/US2017/046135, filed Aug. 9, 2017, and which claims the benefit of priority to U.S. Provisional Application No. 62/377,463, filed Aug. 19, 2016, of which are hereby incorporated by reference in their entirety for all purposes.

BACKGROUND

The process for updating account information can be inefficient. Typically, when a user has their account information registered with another entity, updating the stored account information may involve several steps. For example, the user may need to contact the entity, manually provide updated account information, and provide proof that they are the valid user of the account information. This process is time-consuming and cumbersome. This issue is further exacerbated by current uses of digital accounts in which a user typically has their account information stored by multiple entities (e.g., resource providers, service providers, etc.). For example, when the user replaces their account information, the user has to manually update account information for each entity. Clearly, this process is inefficient, since the user has to repeatedly provide the same updated account information.

Having the user manually update account information can also bring about other issues. In some cases, the user may not remember to update account information stored by certain entities. In other cases, the user may simply not have time to update account information stored by certain entities in a timely manner. As a result, some entities can end up continuing to store account information that is obsolete. This is problematic in cases in which an entity initiates an access request (e.g., transaction) with the user because the entity may utilize obsolete account information. Consequently, the access request may be declined due to use of expired account information. This results in an inefficient utilization of computing resources because the data associated with the access request may still be processed (e.g., analyzed, reformatted, transmitted, etc.) by one or more devices, even though the access request is eventually denied. Given the large volume of electronic access requests that are processed, this additional processing can add an unnecessary load to the computer system and prevent other access requests from being processed in a timely manner.

Embodiments of the invention address this and other problems, individually and collectively.

BRIEF SUMMARY

Embodiments of the present invention relate to a method performed by a server computer. The method may comprise determining, by the server computer, that the access data such as account information of an account has changed. The method may further comprise identifying, by the server computer based upon a plurality of access requests involving access data of a user, a plurality of recurring user access requests between a client device associated with the user and a plurality of resource provider computers that each utilize the access data. The method may further comprise responsive to said determining, automatically transmitting, by the server computer, the changed access data to the plurality of resource provider computers or a plurality of transport computers associated with the resource provider computers. In some cases, the recurring access requests may occur on a periodic or non-periodic basis.

In some embodiments, the step of identifying the plurality of recurring access requests may comprise performing steps for each of the plurality of recurring access requests. The steps may include accessing, by the server computer, a database including information related to access requests and querying, by the server computer, the database for data records associated with the access data of the user using at least some of the access data. The steps may further include determining, by the server computer, a set of the plurality of access requests that involve a resource provider computer from the plurality of resource provider computers based on the data records, detecting, by the server computer, a pattern associated with at least a portion of the set of the plurality of access requests, and determining, by the server computer, that the at least a portion of the set of the plurality of access requests are recurring access requests based on the detected pattern.

In some embodiments, detecting the pattern may be performed in various ways. For example, detecting the pattern may comprise determining, by the server computer, that the at least a portion of the set of the plurality of access requests involve a recurring access request indicator. In another example, detecting the pattern may comprise determining, by the server computer, one or more of (1) a common frequency between the at least a portion of the set of the plurality of access requests, (2) a common access request amount for the at least a portion of the set of the plurality of access requests, (3) a common day shared by the at least a portion of the set of the plurality of access requests, and (4) a common time shared by the at least a portion of the set of the plurality of access requests.

In some cases, the method may further comprise sending, by the server computer, information indicating that the plurality of resource provider computers received changed access data (e.g., account information) to the client device. In some implementations, the information indicating that the plurality of resource provider computers received the changed access data is displayed by the client device in a user interface. In some cases, the information indicating that the plurality of resource provider computers received the changed access data includes a list of resource providers associated with the plurality of resource provider computers.

In some embodiments, the method can further comprise receiving, by the server computer from the client device, an indication to block use of the access data for access requests between the client device and a select resource provider computer from the plurality of resource provider computers. The method can further comprise receiving, by the server computer from the client device, an access request conducted between the client device and the select resource provider computer utilizing the access data. The method may further comprise blocking, by the server computer, the access request.

Embodiments of the invention are further directed to a server computer comprising a processor and a memory element. The memory element can comprise code, executable by the processor, for implementing a method. The method may comprise determining that access data such as account information of an account has changed. The method may further comprise identifying, based upon a plurality of access requests involving an account of a user, a plurality of recurring user access requests between a client device associated with the user and a plurality of resource provider computers that each utilize the access data. The method may further comprise responsive to said determining, automatically transmitting the access data to the plurality of resource provider computers or a plurality of transport computers associated with the resource provider computers.

Embodiments of the invention are also directed to a method performed by a client device. The method can comprise receiving, by the client device from a server computer, a list of resource providers associated with a plurality of resource provider computers, wherein access data of a user is utilized for a plurality of recurring access requests between the client device and the plurality of resource provider computers. The method may further comprise receiving, by the client device from the server computer, information indicating that the plurality of resource provider computers received changed access data. The method can further comprise updating, by the client device, a user interface displayed on a display to show the information indicating that the plurality of resource provider computers received changed access data.

In some embodiments, the method may further comprise additional steps. For example, the method may further comprise receiving, by the client device, information input by the user interacting with the user interface to block use of the access data with a select resource provider computer from the plurality of resource provider computers. The method may further comprise sending, by the client device to the server computer, an indication to block use of the access data for access requests between the client device and the select resource provider computer.

Embodiments of the invention are further directed to a client device comprising a processor and a memory element. The memory element can comprise code, executable by the processor, for implementing a method. The method may comprise receiving, by the client device from a server computer, a list of resource providers associated with a plurality of resource provider computers, wherein access data (e.g., account information of an account) of a user is utilized for a plurality of recurring access requests between the client device and the plurality of resource provider computers. The method may further comprise receiving, from the server computer, information indicating that the plurality of resource provider computers received changed access data. The method can further comprise updating a user interface displayed on a display to show the information indicating that the plurality of resource provider computers received changed access data associated with the account.

These and other embodiments of the invention are described in further detail below.

DETAILED DESCRIPTION

Figure 1:
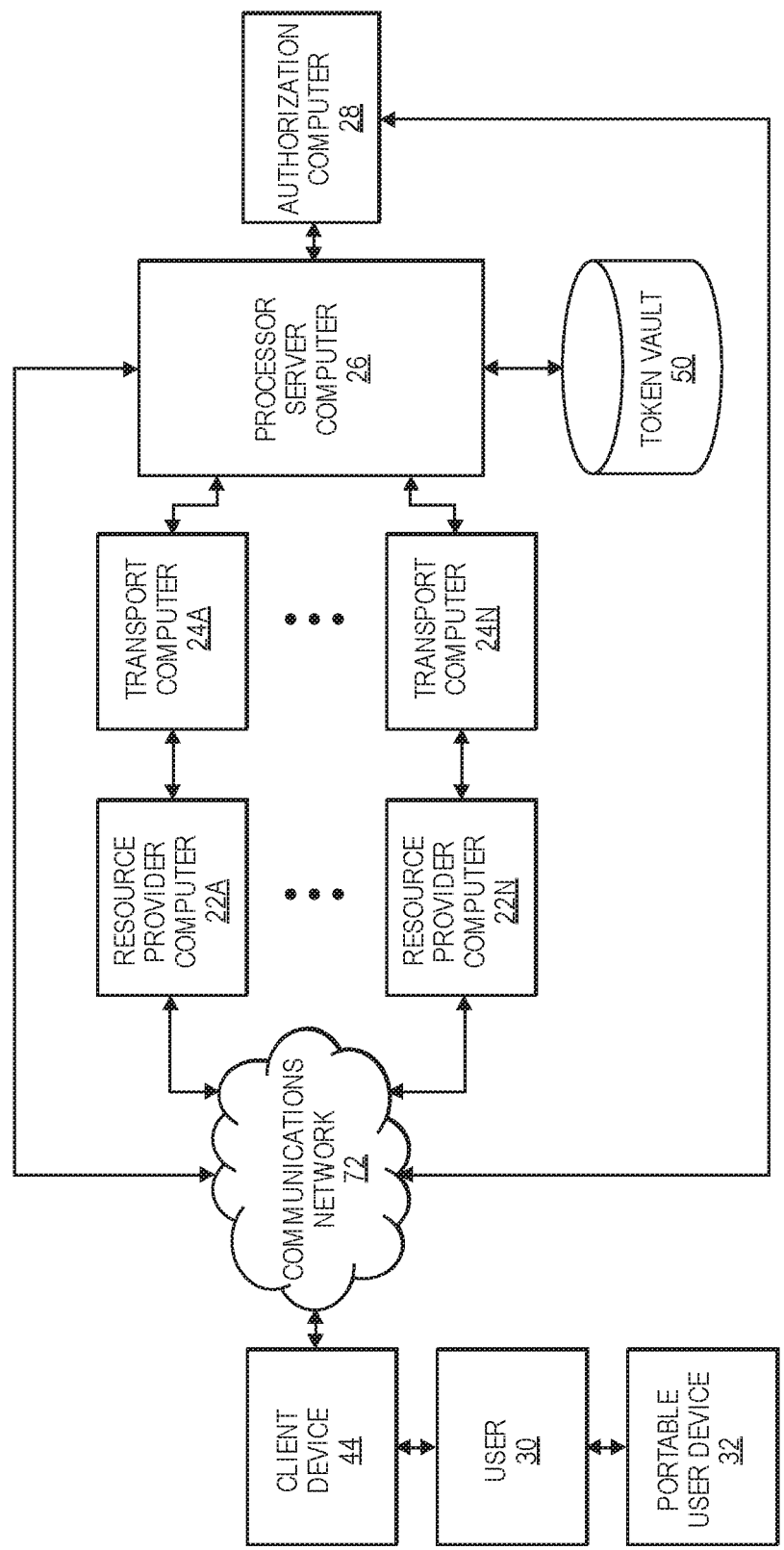
FIG. 1 shows an exemplary system according to embodiments of the invention.

Typically, a user has their account information stored by multiple entities. For example, they may have registered their account information with a plurality of resource providers and a plurality of service providers with which they frequently conduct access requests (e.g., transactions). This may allow their account information to be easily utilized in future access requests and forgoes the need for the user to provide their account information during each access request. This is especially true when the user is involved in recurring access requests, which may occur on a periodic or non-periodic basis. However, when the user replaces their account information with updated account information for any reason (e.g., lost account information, stolen account information, expired account information, etc.), the user has to manually update account information stored by each of the plurality of resource providers and each of the plurality of service providers. This process is inefficient, since the user has to repeatedly provide the same updated account information.

This process can also bring about other issues. For example, the user may not remember to update account information stored by certain entities or may simply not have time to update account information stored by certain entities in a timely manner. Consequently, some entities can end up continuing to store account information that is obsolete. This can be a problem when any of these entities initiates an access request with the user. For example, these entities may attempt to utilize the stored obsolete account information to conduct an access request. However, the access request may be declined because the account information is not valid for use. This results in a waste of computing resources because the data associated with the access request may still be processed (e.g., analyzed, reformatted, transmitted, etc.) by one or more devices, even though the access request is eventually denied. Given the large volume of electronic access requests that are processed, this additional processing can add an unnecessary load to the computer system and prevent other access requests from being processed in a timely manner.

Embodiments of the invention attempt to solve these issues. While conventional systems may need for the user to manually perform processes to update stored account information, embodiments of the invention instead automatically determine entities that need updated information and provides them with the updated information. Thus, embodiments of the invention relate to systems and methods for automatically updating account information stored across several devices in a system. Although "account information" is described in detail, it is understood that "account information" is an example of "access data," and the systems and methods described herein may utilize any type of access data to facilitate embodiments of the invention.

In some cases, a server computer can identify a plurality of recurring access requests from a plurality of access requests involving an account of a user. The plurality of recurring access requests may be between a client device associated with the user and a plurality of resource provider computers that each utilize account information of the account. The server computer can utilize any suitable method of identifying the plurality of recurring access requests, such as detecting a pattern based on a recurring access request indicator in some access requests, frequency between some access requests, a common access request amount for some access requests, and a common day or time shared by some access requests.

The server computer can determine that the account information of the account (i.e., an example of access data) has changed and in response, transmit the changed account information (i.e., an example of changed access data). In some embodiments, the server computer may transmit the changed account information to the plurality of resource provider computers or a plurality of transport computers associated with the resource provider computers. This can allow the resource provider computers to store updated account information in a timely manner.

Before discussing specific embodiments and examples, some descriptions of terms used herein are provided below.

An "authorization request message" may be an electronic message that is sent to an entity to perform an authorization process. In some cases, the authorization request message may be sent to a processor server computer associated with a processing network and/or an authorization computer associated with an authorizing entity to request authorization for an access request. An authorization request message according to some embodiments may comply with (International Organization of Standardization) ISO 8583, which is a standard for systems that exchange electronic transaction information associated with a payment made by a user using a payment device or payment account. The authorization request message may include an account identifier that may be associated with a device or account. An authorization request message may also comprise additional data elements corresponding to "identification information" including, by way of example only: a service code, a CVV (card verification value), a dCVV (dynamic card verification value), an expiration date, etc. An authorization request message may also comprise "access request information," such as any information associated with a current access request, such as the access request amount, resource provider identifier, resource provider location, etc., as well as any other information that may be utilized in determining whether to identify and/or authorize an access request.

An "authorization response message" may be an electronic message reply to an authorization request message utilized for an authorization process. In some embodiments, the authorization response message may be generated by a processor server computer associated with a processing network and/or an authorization computer associated with an authorizing entity. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the processing network) to the resource provider's access device (e.g. POS equipment) that indicates approval of the transaction. The code may serve as proof of authorization. As noted above, in some embodiments, a processing network may generate or forward the authorization response message to the resource provider.

A "token" may include a substitute identifier for some information. For instance, a token may include a series of alphanumeric characters that may be used as a substitute for an original account identifier. In some cases, the token may be a payment token, which may include an identifier for a payment account that is a substitute for a real account identifier, such as a primary account number (PAN). For example, a token "4900 0000 0000 0001" may be used in place of a PAN "4147 0900 0000 1234." In some embodiments, a token may be "format preserving" and may have a numeric format that conforms to the account identifiers used in existing processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived.

"Access data" may include account information, or any other suitable type of data that can be used to access a resource such as data, goods, services, etc. Access data may be specifically associated with a user or a set of users, and may be in any suitable form.

"Account information" may refer to any information associated with a user's account. Such information may be directly related to the account or may be derived from information related to the account. Examples of account information may include an account identifier, a username, a password, user information (e.g., name, age, email address, shipping address, etc.). In some cases, account information may also be known as payment account information, card account information, or the like, and may be associated with a payment device (e.g., payment card). For example, account information may include a PAN (Primary Account Number or "account number"), user name, expiration date, CVV (Card Verification Value), dCVV (Dynamic Card Verification Value), CVV2 (Card Verification Value 2), CVC3 card verification values, etc. CVV2 is generally understood to be a static verification value associated with a payment device. CVV2 values are generally visible to a user (e.g., a user), whereas CVV and dCVV values are typically embedded in memory or authorization request messages and are not readily known to the user (although they are known to the issuer and payment processors).

A "resource providing entity" may be an entity that may make resources available to a user. Resource providing entities may also be known as resource providers. Examples of resource providing entities include resource providers, vendors, suppliers, owners, traders, wallet providers, service providers, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources by the user. In some embodiments, the resources may be services (e.g., digital wallet services).

An "access request" may refer to a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may refer to any information surrounding or related to an access request. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

A "credential on file" may refer to credentials associated with an account (e.g., username, password, account identifier, account number, etc.) that is on file with a resource provider computer, digital wallet server, or other entity. In such situations, the credentials may be used by a resource provider and a user to conduct purchases. In a credential on file access request, the user does not need to specifically provide his or her credentials to a resource provider when conducting n access request, since the resource provider computer associated with the resource provider already stores them. Credential on file access requests may vary in frequency and/or amount and may represent an agreement between a user (e.g., cardholder) and a resource provider to purchase goods or services provided over a period of time or on demand. A credential on file may be alternatively referred to as a card on file or an account on file.

"Recurring access requests" may be multiple access requests processed at predetermined intervals. The intervals may be periodic or non-periodic. In some embodiments, the intervals may not exceed one year between each access request. These recurring access requests may represent an agreement between a user and a resource provider to receive access to goods or services provided over a period of time. A "US Region" access request may be an access request for which a user provides permission, in either written or electronic format, to a resource provider to allow use of account information associated with the user for recurring access to goods or services. Exemplary recurring access requests may comprise recurring access requests to a payment account, such as insurance premiums, subscriptions, and internet service provider monthly fees.

A "server computer" can be a powerful computer or a cluster of computers. For example, the server computer can be a large mainframe, a minicomputer cluster, or a group of servers functioning as a unit. In one example, the server computer may be a database server coupled to a Web server.

Systems according to embodiments of the invention can be described with reference to FIG. 1. Although an exemplary number of users, client devices, portable user devices, resource provider computers, transport computers, processor server computers, and authorization computers are shown in FIG. 1, it is understood that embodiments of the invention are not limited thereto and embodiments of the invention may include any suitable number of these entities. Any of the devices shown in FIG. 1 may be in operative communication with each other over communications network 72 or another suitable communications network.

FIG. 1 shows a system 100 that can be used in an embodiment of the invention. System 100 includes a user 30, who may also be referred to as a "consumer." User 30 may be an individual, or an organization (e.g., a business that is capable of purchasing goods or services). In some embodiments, user 30 may operate a portable user device 32 (e.g., card) associated with an account. User 30 may also operate a client device 44. In some embodiments, user 30 may utilize client device 44 (e.g., personal computer, tablet device, mobile phone) to access, over communications network 72, websites or applications hosted by a plurality of resource providers computers 22A through 22N, transport computers 24A through 24N, processor server computer 26, or authorization computer 28. User 30 may utilize client device 44 to make recurring access requests to the plurality of resource providers computers 22A through 22N using their account associated with portable user device 32. It is understood that in some embodiments, portable user device 32 may also be client device 44.

Communications network 72 may comprise a plurality of networks for secure communication of data and information between entities. In some embodiments, communications network 72 may follow a suitable communication protocol to generate one or more secure communication channels. A communication channel may in some instances comprise a "secure communication channel," which may be established in any known manner, including the use of mutual authentication and a session key and establishment of an SSL session. However, any method of creating a secure channel may be used. By establishing a secure channel, sensitive information may be securely transmitted.

Any suitable communications protocol may be used for generating a communications channel. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described in system 100 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Portable user device 32 can be hand-held and compact. For example, portable user device 32 may fit into a user's wallet and/or pocket (e.g., pocket-sized). Some exemplary portable user devices may include smart cards, ordinary credit or debit cards (with a magnetic strip), keychain devices (such as the Speedpass™ commercially available from Exxon-Mobil Corp.), etc. Other examples of portable user devices include cellular phones, personal digital assistants (PDAs), pagers, payment cards, security cards, access cards, smart media, transponders, wearable devices (e.g., smart watch, smart jewelry, smart clothing, etc.) and the like. The portable user devices can also be debit devices (e.g., a debit card), credit devices (e.g., a credit card), or stored value devices (e.g., a stored value card).

Client device 44 may be any suitable computing device operated by a user. Client device 44 may be capable of communicating with other devices over a network. Some non-limiting examples of such user devices include cellular phones, keychain devices, personal digital assistants (PDAs), notebooks, laptops, notepads, smart watches, fitness bands, jewelry, automobiles with remote communication capabilities, personal computers, cards (e.g., smart cards, magnetic stripe cards, etc.), and the like. More detail regarding client device 44 may be found in the description below with respect to FIG. 3.

Resource provider computer 22A through resource provider computer 22N may be server computers associated with resource providers. In some cases, these resource providers may include those with which user 30 performs recurring access requests. Each of resource provider computers 22A through 22N may host a website or application through which user 30, using their client device 44, may communicate with the plurality of resource provider computers. It is understood that there may be any suitable number of resource provider computers and that the depiction of resource provider computers 22A through 22N in FIG. 1 is not meant to be restrictive.

Transport computers 24A through 24N may be respectively associated with and in communication with resource providers 22A through 22N. In some cases, transport computers 24A through 24N can be institutions or other entities that store account information for resource providers 22A through 22N. Additionally, transport computers 24A through 24N may route information between devices, such as between the plurality resource provider computer 22A through 22N and processor server computer 26. Transport computers 24A through 24N may be in communication with processor server computer 26 and authorization computer 28 via processor server computer 26. It is understood that there may be any suitable number of transport computers corresponding to the plurality of resource provider computers and that the depiction of transport computers 24A through 24N in FIG. 1 is not meant to be restrictive.

Processor server computer 26 may include data processing subsystems, networks, and operations used to support and deliver authorization services, exception file services, and clearing and settlement services. Processor server computer 26 may operate a processing network. An exemplary processing network may include VisaNet™. Processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Processor server computer 26 may communicate over any suitable wired or wireless network, including the Internet. In some embodiments, processor server computer 26 may be a token service provider and may be in communication with token vault 50, which may store tokens associated with accounts of user 30.

In some embodiments, processor server computer 26 may be in communication with a wallet provider computer. The wallet provider computer may be operated by or associated with an application provider. The application provider may be an entity that provides an application to client device 44 for use by a user. In some embodiments, the application provider can be a wallet provider that provides a mobile wallet or payment application to client device 44. The wallet provider computer may maintain one or more digital wallets for each user, and each digital wallet may be associated with payment data for one or more payment accounts. Examples of digital wallets may include Visa Checkout™ or Google™ Wallet, etc. The wallet provider computer may operate a server computer that may send and receive messages to and from the wallet application on client device 44. In some embodiments, the wallet provider computer may store account information (e.g., account on file) associated with user 30.

Token vault 50 may comprise any information related to tokens. For example, token vault 50 may store tokens associated with portable user device 32 and a mapping of the tokens to their associated payment accounts. Token vault 50 may comprise any sensitive information (e.g., account number) associated with the tokens. In some embodiments, processor server computer 26 may communicate with token vault 50 to de-tokenize a token. In some cases, token vault 50 may reside at processor server computer 26.

Authorization computer 28 may be a computer that can perform an atuhorization process. In some embodiments, authorization computer 28 may be a computer run by a business entity (e.g., a financial institution) that may have issued the payment (credit/debit) card, account numbers or payment tokens used for the access requests. Some systems may perform both authorization computer and transport computer functions. When an access request is conducted using an account, authorization computer 28 may verify the account and respond with an authorization response message to a transport computer that may be forwarded to a corresponding access device, if applicable, or resource provider computer. In some embodiments, authorization computer 28 may communicate with processor server computer 26 to tokenize the newly approved account. In some embodiments, authorization computer 28 may host an application that runs on client device 44. An issuer computer may be an example of an authorization computer or the like.

At a later time (e.g., at the end of the day), a clearing and settlement process can occur between transport computers 24A through 24N, processor server computer 26, and authorization computer 28.

Any of the computing devices in FIG. 1 (e.g., portable user device 32, client device 44, resource provider computes 22A through 22N, transport computers 24A through 24N, processor server computer 26, authorization computer 28) may include a processor and a computer readable medium comprising code, executable by the processor for performing the functionality described herein.

Figure 2:
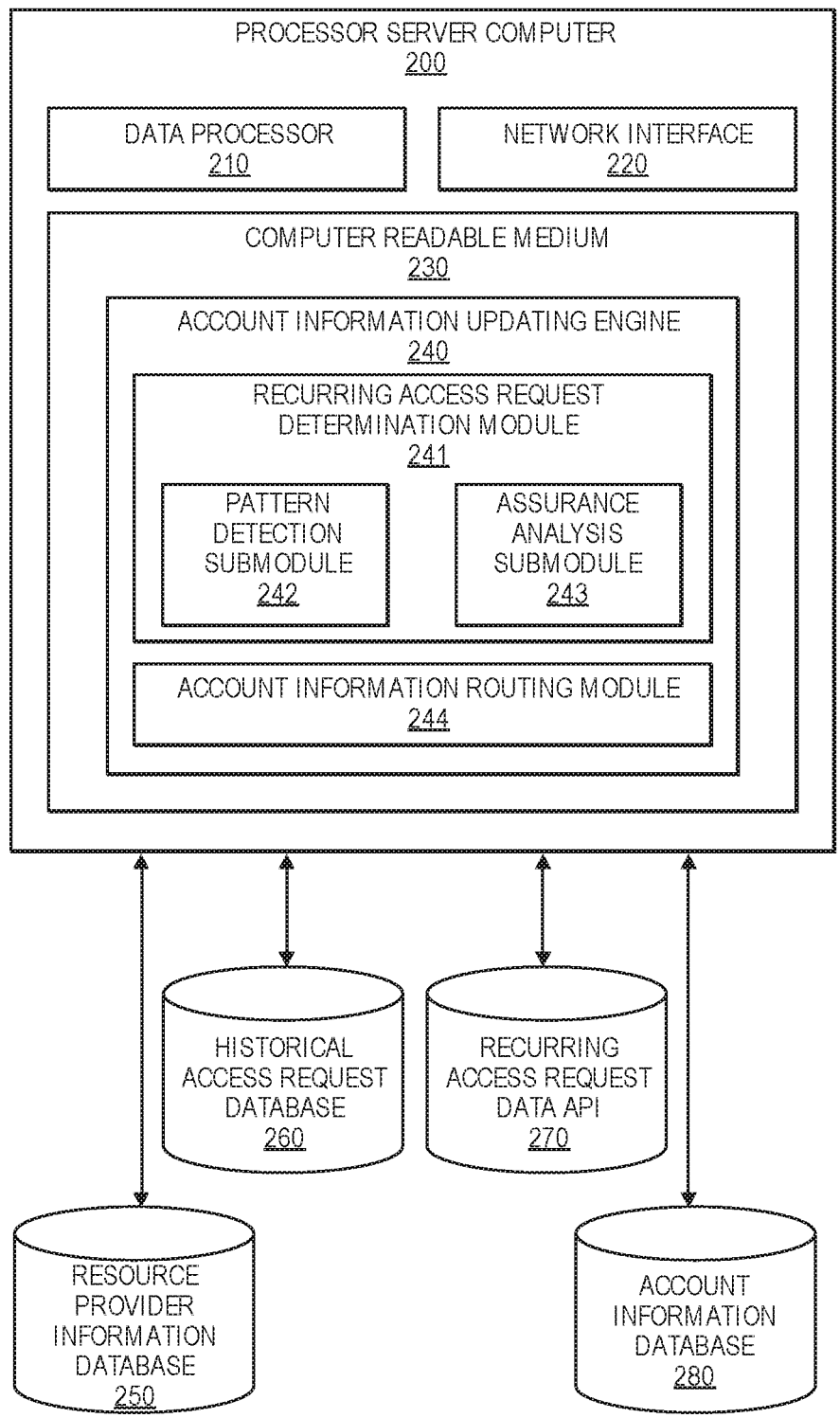
FIG. 2 shows an exemplary block diagram of a processor server computer according to embodiments of the invention.

FIG. 2 shows a block diagram of an exemplary processor server computer 200. FIG. 2 shows a number of components, and processor server computer 200 according to embodiments of the invention may comprise any suitable combination or subset of such components. Server computer 200 includes a data processor 210 for executing functions, a network interface 220 for communicating with other computing devices, and a computer readable medium 230 for storing data. The computer readable medium 230 may comprise a number of software modules including an account information updating engine 240, which may comprise a recurring access request determination module 241, pattern detection submodule 242, assurance analysis submodule 243, account information routing module 244, and an updated account information status determination module 245.

Other modules and submodules may also reside on computer readable medium 230. Examples of additional modules may data extraction (e.g., for retrieving data from external data sources such as databases) modules, storage modules, and message modification modules. Each module residing on computer readable medium 230 may be combined with any of the additional modules as appropriate. Any of the modules may comprise one or more submodules, where each submodule may comprise one or more functions implemented by code, executable by data processor 210.

In some embodiments, server computer 200 may also be in communication with several databases including resource provider information database 250, historical access request database 260, recurring access request data API 270, and account information database 280. Each database may be a conventional, fault tolerant, relational, scalable, secure database such as those commercially available from Oracle™ or Sybase™. In some embodiments, any of the databases may be combined into a single database, or may be separated into multiple databases. Server computer 200 may also be in communication with other databases that are not shown in FIG. 2.

Data processor 210 (e.g., microprocessor) may process functions of processor server computer 200. Data processor 210 may include hardware within processor server computer 200 that can carry out instructions embodied as code in computer readable medium 230. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Network interface 220 may be any suitable combination of hardware and software that enables data to be transferred to and from processor server computer 200. Network interface 220 may enable processor server computer 200 to communicate data to and from another device (e.g., resource provider computer, authorization computer, etc.). Some examples of network interface 220 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 220 may include Wi-Fi™.

Data transferred via network interface 220 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 220 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Recurring access request determination module 241 may enable, with data processor 210 determination of recurring access requests from a plurality of access requests. Recurring access request determination module 241 may comprise pattern detection submodule 242 and assurance analysis submodule 243.

Pattern detection submodule 242 may enable, in conjunction with data processor 210, determination of patterns amongst a plurality of access requests. First, pattern detection submodule 242 may obtain, with data processor 210, access request data associated with a plurality of access requests. In some embodiments, pattern detection submodule 242 may do this by accessing historical access request database 260 and querying historical access request database 260 for access request data associated with the plurality of access requests. Typically, the query may indicate one or more common characteristics for which access request data is to be aggregated by historical access request database 260. For example, the query may indicate to retrieve access request data associated with access requests that were performed utilizing a certain account information (e.g., account identifier) and involving a certain resource provider. In some cases, the query may also indicate a time period over which access request data for corresponding access requests should be retrieved. In some embodiments, the retrieved access request data may be in the form of a plurality of access request messages (e.g., transaction messages) corresponding to access requests.

After retrieval of access request data associated with the plurality of access requests, pattern detection submodule 242 may determine, in conjunction with data processor 210, whether the access request data indicates any patterns. In some embodiments, pattern detection submodule 242 may access, with data processor 210, recurring access request data API 270 for code that can implement algorithms to utilize to detect patterns within access request data. In some embodiments, pattern detection submodule 242 may implement, in conjunction with data processor 210, a single algorithm to analyze the access request data. In other embodiments, pattern detection submodule 242 may implement, in conjunction with data processor 210, more than one algorithm to analyze the access request data. In some embodiments, the algorithms may be assigned a priority order indicating a sequence in which pattern detection submodule 242 is to implement the algorithms for analyzing the access request data. In some embodiments, the priority order may be determined based on assurance levels associated with each of the algorithms.

The algorithms may enable determining a pattern in at least some access request data corresponding to access requests that were conducted over a time period. One exemplary algorithm may comprise determining that an account on file token (e.g., credential on file token) in access request data indicates an active status (e.g., not expired, suspended, etc.). Another exemplary algorithm may comprise determining information, which may be obtained from resource provider information database 250, related to resource providers involved in access requests. For example, pattern detection submodule 242 may determine, with data processor 210, whether a resource provider has previously requested processor server computer 200 to update account information. Other exemplary algorithms may include determining a pattern relating to a common frequency between the at least a portion of the set of the plurality of access requests, a common access request amount for the at least a portion of the set of the plurality of access requests, a common day shared by the at least a portion of the set of the plurality of access requests, and a common time shared by the at least a portion of the set of the plurality of access requests.

Some exemplary algorithms may comprise determining a recurring access request indicator in access request data corresponding to a set of access requests. The recurring access request indicator may be any suitable indicator, such as a flag value (e.g., ECI 2 indicator, installment payment indicator, etc.) that indicates that the access request is recurring based on a predetermined mapping. In some cases, the recurring access request indicator may be in the form of a credential on file indicator (e.g., "POS Entry Mode" 10) that indicates a recurring access request. In some embodiments, the recurring access request indicator may be in the form of an access request category indicator, which may indicate that the access request is of recurring nature. For example, an access request category indicator may be in the form of a resource provider category code of "Bill Pay," which can indicate that the access request is a recurring payment.

Assurance analysis submodule 243 may enable, in conjunction with data processor 210, determination of an assurance level regarding detection of a recurring access request. The assurance level may be an integer, string of characters, or the like that can indicate reliability of an algorithm for determining a recurring access request from access request data associated with a plurality of access requests. When pattern detection submodule 242 implements a single algorithm, assurance analysis submodule 243 may determine, with data processor 210, the assurance level based on a lookup of a predetermined assurance level. In some implementations, when pattern detection submodule 242 implements multiple algorithms, assurance analysis submodule 243 may determine, with data processor 210, an overall assurance level based on assurance levels associated with each of the multiple algorithms. In some cases, the overall assurance level may simply be the highest assurance level of the implemented algorithms. In other cases, the assurance level may be a value determined based on combining assurance levels associated with each of the multiple algorithms. For example, combining may comprise any suitable series of operations including adding, averaging, multiplying with weights, or other operations.

Some algorithms may be associated with predetermined assurance levels. For example, algorithms for detecting a pattern based on determining that an account on file token is active and determining a certain recurring access request indicator (e.g., "POS Entry Mode" 10) in the access request data may be associated with a high assurance level. Additionally, in some cases, algorithms for detecting a pattern based on determining an access request category indicator (e.g., resource provider category code) and determining other types of recurring access request indicators (e.g., ECI 2 indicator, installment indicator, etc.) in the access request data may be associated with a medium assurance level. Further, in some cases, algorithms for detecting a pattern based on other factors, such as the number of access requests conducted over a period or the frequency of access requests over a period may be associated with a low assurance level.

Account information routing module 244 may enable, in conjunction with data processor 210, transmission of account information to appropriate entities. For example, after determining that account information is to be updated, account information routing module 244 may determine, with data processor 210, information for sending updated accounted information to a resource provider. In some cases, the information may include a link in a data header of a message, where the link may route to the resource provider. In some cases, account information routing module 244 may determine, with data processor 210, the information from resource provider information database 250.

Resource provider information database 250 may include any information related to resource providers. In some cases, resource provider information database 250 may comprise, for each resource provider, information indicating a resource provider name, location, resource provider type (e.g., category code), accepted method for conducting access request (e.g., contact, contactless, etc.), and other information that may help identify a resource provider.

Historical access request database 260 may include information related to previous access requests. In some embodiments, the information may include access request data associated with historical access request. In some cases, access request data may be in the form of access request messages corresponding to a plurality of access requests. The access request message may store one or more values related to the access request (e.g., time, date, location, type of access request, entities involved, access request amount, resource requested, etc.).

Recurring access request data API 270 may include code for determining recurring access requests. In some embodiments, recurring access request data API 270 may comprise code for implementing algorithms for detecting patterns from access request data associated with a plurality of access requests. In some embodiments, recurring access request data API 270 may also include code for requesting a status of whether a certain entity (e.g., resource provider) received updated account information for a certain account as well as code for responding with the status. In some cases, the status may indicate whether or not the updated account information has been received by the entity and if so, the date of receipt.

Account information database 280 may include any information related to accounts. In some cases, account information database 280 may include, for each account, information indicating an account identifier, a user identifier corresponding to a user of the account, any devices related to the account, verification values, etc. In some cases, account information database 280 may also include token information corresponding to the accounts, such as a mapping between tokens and their corresponding account identifiers and the statuses associated with tokens (e.g., active, suspended, expired, etc.).

Figure 3:
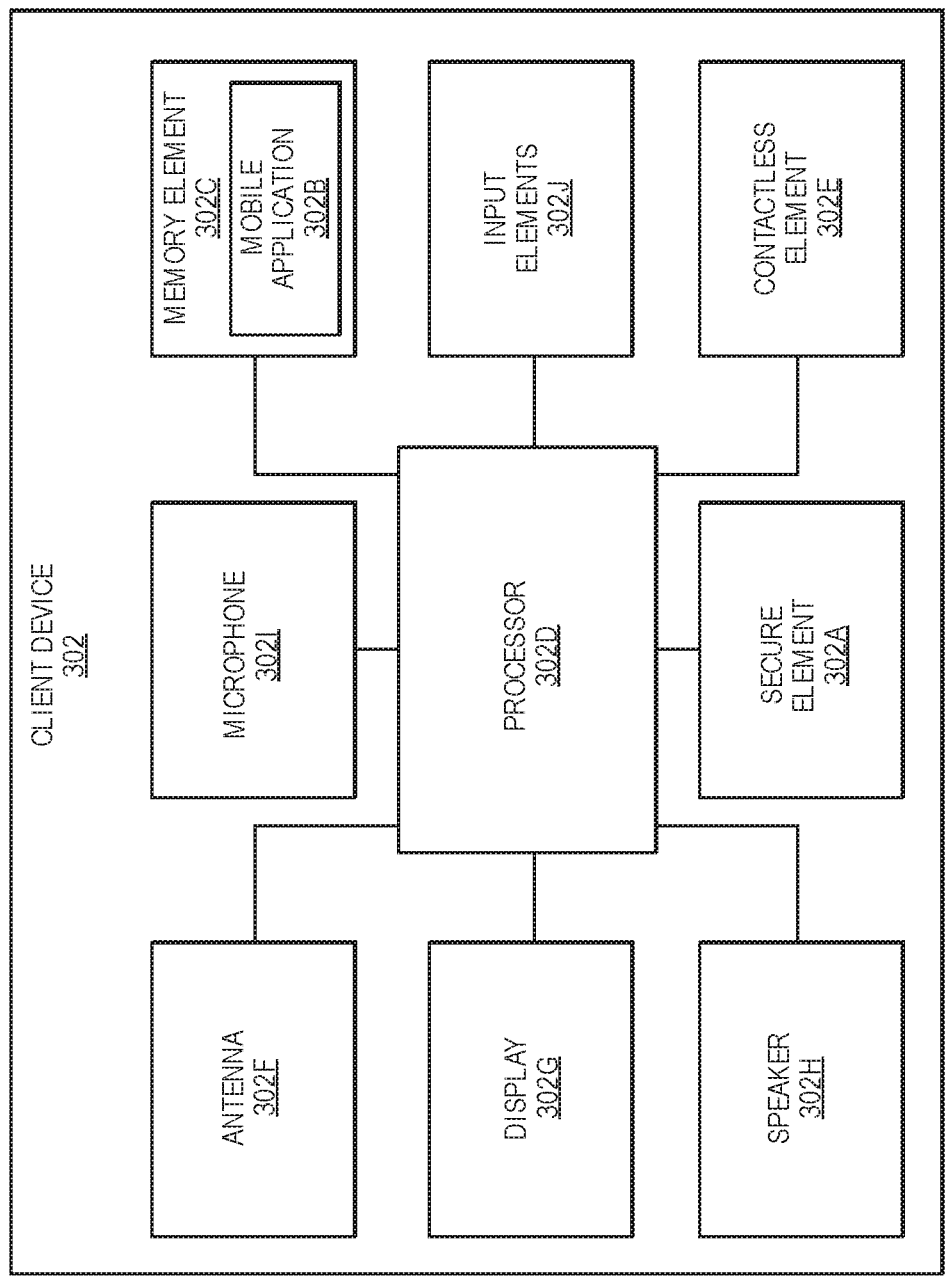
FIG. 3 shows an exemplary block diagram of a client device according to embodiments of the invention.

FIG. 3 depicts a block diagram of an exemplary client device 302. FIG. 3 shows a number of components, and client device 302 according to embodiments of the invention may comprise any suitable combination or subset of such components.

Client device 302 may include a processor 302D (e.g., a microprocessor) for processing functions of client device 302. One exemplary function enabled by processor 302D includes processing functions of display 302G to allow a user to see information (e.g., interfaces, contact information, messages, etc.). Processor 302D may include hardware within client device 302 that can carry out instructions embodied as code in a computer-readable medium.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Client device 302 may comprise a secure element 302A. Secure element 302A may be a secure memory on client device 302 such that the data contained on secure element 302A cannot easily be hacked, cracked, or obtained by an unauthorized entity. Secure element 302A may be utilized by client device 302 to host and store data and applications that may require a high degree of security. Secure element 302A may be provided to client device 302 by a secure element issuer. Secure element 302A may be either embedded in the handset of client device 302 or in a subscriber identity module (SIM) card that may be removable from client device 302. Secure element 302A can also be included in an add-on device such as a micro-Secure Digital (micro-SD) card or other portable storage device.

Secure element 302A may store any suitable sensitive information. For example, secure element 302A may store access data (e.g., account information, token information, etc.) associated with a user. Other information that may be stored in secure element 302A may include user information or user data (e.g., name, date of birth, contact information, etc.). In other embodiments, some, none, or all of the foregoing information may be stored in memory element 302C or may be stored at a remote server computer (e.g., in the cloud).

Client device 302 may comprise a memory element 302C (e.g., computer readable medium). Memory element 302C may be present within a body of client device 302 or may be detachable from the body of client device 302. The body of client device 302 may be in the form of a plastic substrate, housing, or other structure. Memory element 302C may store data (e.g., applications, etc.) and may be in any suitable form (e.g., a magnetic stripe, a memory chip, etc.).

Memory element 302C may comprise a mobile application 302B. Mobile application 302B may be computer code or data stored on a computer readable medium (e.g. memory element 302C or secure element 302A) that may be executable by processor 302D to complete a task (e.g., provide a service). Mobile application 302B may be an application that operates on client device 302 and that may provide a user interface for user interaction (e.g., to enter and view information).

In some embodiments, mobile application 302B may be a service provider application. Mobile application 302B may communicate with a service provider computer to retrieve and return information during processing of any of a number of services offered to the user via client device 302 (e.g., providing access to a resource).

Client device 302 may further include a contactless element 302E, which may typically be implemented in the form of a semiconductor chip (or other electronic data storage element) with an associated wireless transfer (e.g., data transmission) element, such as an antenna 302F. Contactless element 302E may be associated with (e.g., embedded within) client device 302. Data or control instructions transmitted via a cellular network may be applied to contactless element 302E by means of a contactless element interface (not shown). In some cases, the contactless element interface may function to permit the exchange of data and/or control instructions between the user device circuitry (and hence the cellular network) and an optional contactless element 302E.

Contactless element 302E may be capable of transferring and receiving data using a near-field communications (NFC) capability (or NFC medium) typically in accordance with a standardized protocol or data transfer mechanism (e.g., ISO 14443/NFC). Client device 302 may support contactless transactions using the EMV contactless communication protocol (EMV-CCP), which is based on ISO 14443, in order to interact with access devices (e.g., reader devices). This capability may typically be met by implementing NFC. The NFC capability of client device 302 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the client device 302 and an interrogation device. Thus, client device 302 may be capable of communicating and transferring data and/or control instructions via both cellular network and near-field communications capability.

Client device 302 may further include an antenna 302F for wireless data transfer (e.g., data transmission). Antenna 302F may be utilized by client device 302 to send and receive wireless communications. Antenna 302F may assist in connectivity to the Internet or other communications networks and enable data transfer functions. Antenna 302F may enable SMS, USSD, as well as other types of cellular communications, such as voice call and data communications.

Client device 302 may include a display 302G that may show information to a user. Display 302G may be any suitable screen that enables touch functionality. In some embodiments, display 302G of client device 302 may display a user interface (e.g., of a mobile application or website) that may allow the user to select and interact with objects presented on display 302G. The objects may include, but may not be limited to, menus, text fields, icons, and keys/inputs on a virtual keyboard.

Client device 302 may include a speaker 302H, which may be any suitable device that can produce sound in response to an electrical audio signal. Speaker 302H may play recorded sounds, as well as prerecorded messages to communicate with a user. In some cases, the user may be able to receive instructions by voice communications played by speaker 302H to which the user may respond (e.g., by returning voice command, activating input elements, etc.).

Client device 302 may include a microphone 302I, which may be any suitable device that can convert sound to an electrical signal. Microphone 302I may be utilized to capture one or more voice segments from a user. For example, microphone 302I may allow the user to transmit his or her voice to client device 302. In some embodiments, the user may utilize voice commands detected by microphone 302I to provide instructions to client device 302. In some cases, the user may provide voice commands detected by microphone 302I to navigate through mobile application 302B.

Client device 302 may further include input elements 302J to allow a user to input information into the device. Example input elements 302J include hardware and software buttons, audio detection devices (e.g., microphone), biometric readers, touch screens, and the like. A user may activate one or more of input elements 302J, which may pass user information to client device 302. In some cases, one or more of input elements 302J may be utilized to navigate through various screens of mobile application 302B.

In some embodiments, where client device 302 is a phone or other similar computing device, client device 302 may include a browser stored in the memory element 302C and may be configured to retrieve, present, and send data across a communications network (e.g., the Internet). In such embodiments, client device 302 may be configured to send data as part of an access request. In some embodiments, client device 302 may provide the data upon request from another entity (e.g., access device).

Figure 4:
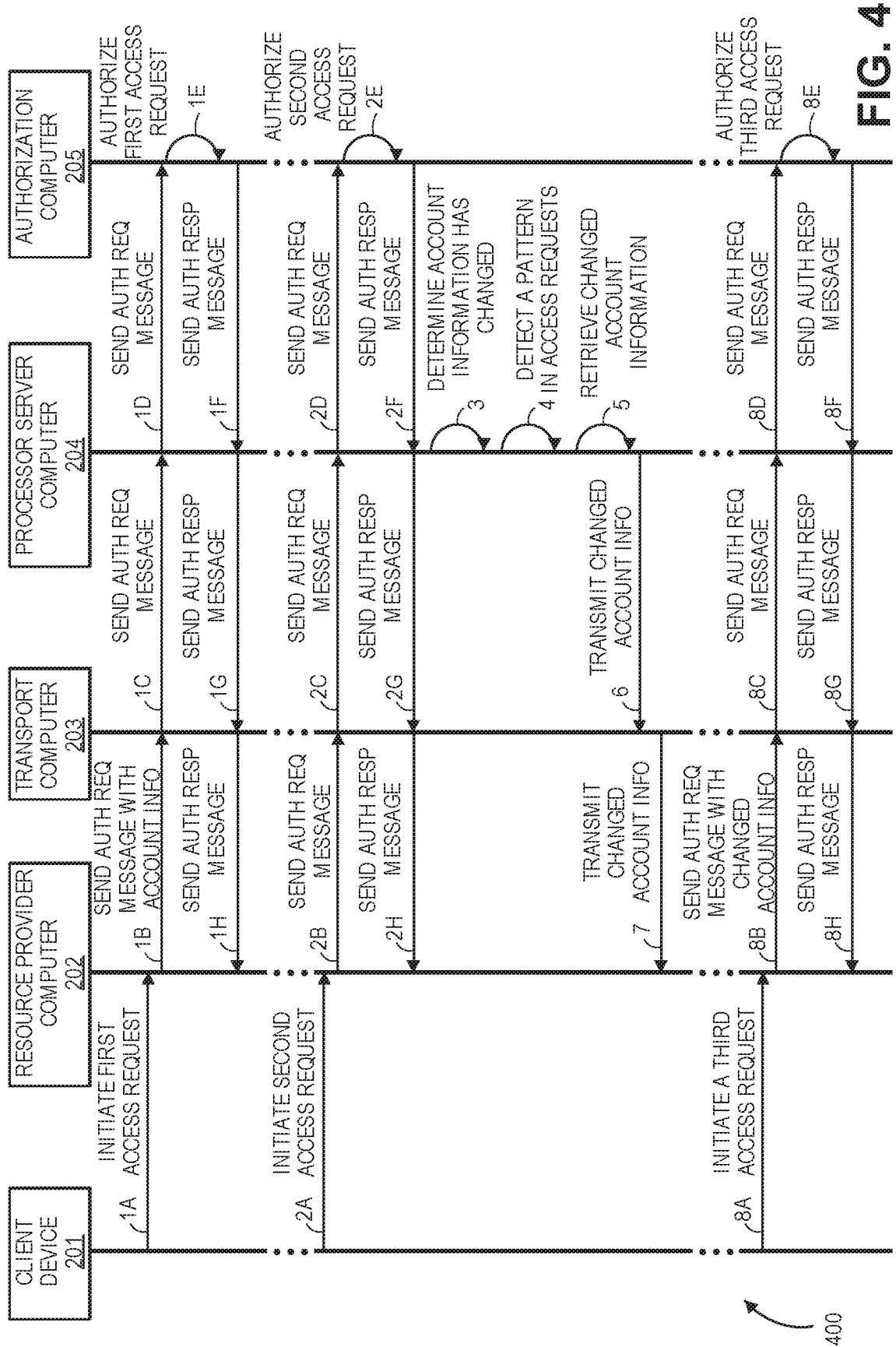
FIG. 4 shows an exemplary flowchart according to embodiments of the invention.

FIG. 4 shows an exemplary flow 400 according to embodiments of the invention. FIG. 4 includes a client device 201 operated by a user that conducts a plurality of access requests with a resource provider computer 202, a transport computer 203, a processor server computer 204, and an authorization computer 205. The devices in FIG. 4 may have similar characteristics with the corresponding devices in FIGS. 1-3.

Flowchart 400 shows a method of identifying a resource provider computer having recurring access requests and automatically notifying the identified resource provider computer when account information is updated. In the flowchart 400 and in the description below, "account information" is used as an example of "access data." The automatic identification of such recurring access requests may be based upon an analysis of one or more of detected patterns of access request data associated with a plurality of access requests.

Embodiments of the invention provide advantages. For example, resource provider computers do not need to repeatedly query a processor server computer or other entity to check whether there have been any updates to accounts. By enabling automatic identification and notifications of updated account information, embodiments of the invention enable resource provider computers to have fewer declined access requests. For example, resource provider computers will not have to decline access requests based on attempting to charge payments to an obsolete account. This improves efficiency compared to conventional systems, which waste computing resources because an access request may still be processed (e.g., analyzed, reformatted, transmitted, etc.) by one or more devices, even though the access request is eventually denied. Given the large volume of electronic access requests that are processed, forgoing this additional processing can improve efficiency of the computer system and allow other access requests to being processed in a timely manner.

Further, users do not need to proactively update multiple platforms that enable recurring access requests. This can enable the user to forgo cumbersome processes for updating account information for multiple entities, such as conducting authentication processes for each of a plurality of resource provider computers and service providers (e.g., account issuers), deleting old account information stored by each of the plurality of resource provider computers and service providers, and providing new account information to the plurality of resource provider computers and service providers.

Steps 1A-1H depict processing that may be performed for a first access request conducted between the user operating client device 201 and the resource provider associated with resource provider computer 202. At step 1A, the user may utilize their client device 201 to initiate the first access request with resource provider computer 202. In some cases, the user may access a website or application hosted by resource provider computer 202 on client device 201 and send an indication that they want to perform an access request. In some embodiments, resource provider computer 202 may already have account information associated with the user so that the user does not have to enter account information when initiating the first access request.

At step 1B, resource provider computer 202 may generate an authorization request message for the first access request. In some cases, the authorization request message may include access request data, which may be any suitable information related to the first access request. For example, the access request data may include the account information (e.g., PAN, payment token corresponding with PAN, etc.) of the user. The access request data may also include details associated with entities (e.g., resource provider computer, processor server computer, authorization computer, etc.) involved in processing the first access request, such as entity identifiers (e.g., resource provider name, etc.), location information associated with the entities, and information indicating the type of entity (e.g., category code). The access request data can also include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Resource provider computer 202 may send the authorization request with the account information to transport computer 203.

At steps 1C and 1D, the authorization request message may be sent from transport computer 203 to authorization computer 205 via processor server computer 204. In some embodiments, processor server computer 204 may modify information in the authorization request message before forwarding it to authorization computer 205. For example, processor server computer 204 may include fraud information or other relevant data that may help authorization computer 205 make an authorization decision for the first access request.

At step 1E, authorization computer 205 may authorize the first access request. In some cases, authorization computer 205 may authorize the access request based on access request data stored in the authorization request message. Authorization computer 205 may generate an authorization response message including an indication that the first access request is authorized.

At steps 1F, 1G, and 1H, the authorization response message may be sent from authorization computer 205 to resource provider computer 202 via processor server computer 204 and transport computer 203. In some embodiments, upon determining that the first access request was authorized by authorization computer 205, processor server computer 204 may store access request data related to the first access request based on the access request data in the authorization response message. In some embodiments, processor server computer 204 may store the authorization request message or authorization response message corresponding to the first access request. In some embodiments, while not shown in FIG. 4, a notification may be sent to client device 201 indicating that the first access request was authorized.

At a later time, the user operating client device 201 may initiate a second access request with resource provider computer 202. Steps 2A-2H depict processing that may be performed for the second access request and may be similar to steps 1A-1H described with respect to the first access request conducted by the user. It is understood that while not shown in FIG. 4 for simplicity, one or more additional access requests may be conducted between client device 201 and resource provider computer 202 prior to the first access request, in between the first access request and the second access request, or after the second access request.

At step 3, processor server computer 204 may determine that account information associated with the user has changed. In some embodiments, processor server computer 204 may store, in an account information database, account information (e.g., account identifier, token, etc.) associated with the user. The account information database may include old account information as well as updated account information associated with the user. In some cases, processor server computer 204 may determine, based on periodic checks or in real-time, when the account information database has been updated to include changed account information associated with the user. Some exemplary reasons for changing account information may include the user replacing lost account information, canceled account information, stolen account information, or expired account information. Some other exemplary reasons may include that a token lifecycle management services of processor server computer 204 may replenish tokens due to expiration, cancellation, or other circumstances, where the tokens may be stored by the account information database. Upon determining that the account information associated with the user has changed, processor server computer 204 may proceed to determine resource providers that may have an account on file for the user and thus may be storing obsolete account information. Processor server computer may make this determination based on analyzing access request data associated with previous access requests conducted by the user as described with respect to step 4.

At step 4, processor server computer 204 may detect a pattern based on previous access requests conducted by the user. In some embodiments, the pattern may be detected by identifying one or more common characteristics between the access requests. Processor server computer 204 may utilize any suitable algorithms for detecting the pattern. In some cases, processor server computer 204 may access a recurring access request data API to determine code for one or more algorithms to implement for detecting the pattern.

The algorithms may enable detection of a pattern in at least some access request data corresponding to previous access requests that were conducted by the user over a time period. One exemplary algorithm may comprise determining that an account on file token (e.g., credential on file token) in access request data indicates an active status (e.g., not expired, suspended, etc.). Another exemplary algorithm may comprise determining information, which may be obtained from a resource provider information database, related to resource providers involved in access requests. For example, processor server computer 204 may determine whether a resource provider has previously requested to update account information. Other exemplary algorithms may include determining a pattern relating to a common frequency between the at least a portion of the set of the plurality of access requests a common access request amount for the at least a portion of the set of the plurality of access requests, a common day shared by the at least a portion of the set of the plurality of access requests, and a common time shared by the at least a portion of the set of the plurality of access requests. Other information, such as a common resource provider (e.g., merchant) name may also be used by the algorithm to detect the presence of a pattern relating to a particular resource provider.

Other exemplary algorithms may comprise determining a recurring access request indicator in access request data corresponding to a set of access requests. The recurring access request indicator may be any suitable indicator, such as a flag value (e.g., ECI 2 indicator, installment payment indicator, etc.) that indicates that the access request is recurring based on a predetermined mapping. In some cases, the recurring access request indicator may be in the form of a credential on file indicator (e.g., "POS Entry Mode" 10) that indicates a recurring access request. Further details regarding processing of access requests involving the credential on file indicator as described above can be found in U.S. Provisional Application No. 62/219,078, filed Sep. 15, 2015, and U.S. patent application Ser. No. 15/265,576, filed on Sep. 14, 2016, which are hereby incorporated by reference in their entirety for all purposes. In some embodiments, the recurring access request indicator may be in the form of an access request category indicator, which may indicate that the access request is of recurring nature. For example, an access request category indicator may be in the form of a resource provider category code of "Bill Pay," which can indicate that the access request is a recurring payment.

In some embodiments, these algorithms may each be associated with an assurance level. The assurance level may indicate the reliability with which the algorithm can determine whether an access request is a recurring access request. For example, algorithms for detecting a pattern based on determining that an account on file token is active and determining a certain recurring access request indicator (e.g., "POS Entry Mode" 10) in the access request data may be associated with a high assurance level. Additionally, in some cases, algorithms for detecting a pattern based on determining an access request category indicator (e.g., resource provider category code, type of access request, etc.) and determining other types of recurring access request indicators (e.g., ECI 2 indicator, installment indicator, etc.) in the access request data may be associated with a medium assurance level. Further, in some cases, algorithms for detecting a pattern based on other factors that may be indicative of recurring access requests, such as the number of access requests conducted over a period or the frequency of access requests over a period may be associated with a low assurance level.

In some embodiments, processor server computer 204 may implement algorithms based on a priority order. In some implementations, the priority order may be designated based on assurance levels associated with the algorithms such that the algorithm with the highest assurance level corresponds to the highest priority and the algorithm with the lowest assurance level corresponds to the lowest priority. For example, processor server computer 204 may first implement one or more algorithms with high assurance before determining whether additional algorithms are to be implemented. In some cases, if processor server computer 204 determines that the access request is likely a recurring access request based on the algorithms with high assurance, processor server computer 204 may not implement any further pattern detection algorithms. In some cases, processor server computer 204 may make this determination based on whether a threshold number (e.g., at least one) of the algorithms with high assurance levels indicates that the access request is likely a recurring access request. In other cases, processor server computer 204 may make this determination based on a combination of the results of the algorithms with high assurance. However, if processor server computer 204 determines that the access request is likely not a recurring access request based on the algorithms with high assurance, processor server computer 204 may proceed to implement one or more algorithms with medium assurance. If at least a threshold number of the algorithms of the combination of results of the algorithms with medium assurance indicate that the access request is likely a recurring access request, processor server computer 204 may not implement any further pattern detection algorithms. However, if processor server computer 204 determines that the access request is likely not a recurring access request based on the algorithms with medium assurance, processor server computer 204 may proceed to implement one or more algorithms with low assurance. Processor server computer 204 may make the determination of whether the access request is a recurring access request based on the outputs of the one or more algorithms with low assurance. By first implementing algorithms with high assurance followed by those with medium assurance and low assurance, processor server computer 204 may minimize the number of pattern detection algorithms, which can also minimize utilization of processing power of the computer system.

In the exemplary case shown in flow 400, processor server computer 204 may detect a pattern between access request data corresponding to the first access request (steps 1A-1H) and request data corresponding to the second access request (steps 2A-2H) conducted between the user and resource provider computer 202. In some cases, processor server computer 204 access the recurring access request data API for code to implement an algorithm with high assurance. For example, processor server computer 204 may implement an algorithm to determine whether the access request data for the first access request and the access request data for the second access request include a recurring access request indicator (e.g., "POS Entry Mode" 10). Since the result may indicate that a recurring access request indicator does not exist, processor server computer 204 may access the recurring access request data API for code to implement an algorithm with medium assurance. For example, processor server computer 204 may implement an algorithm to determine whether the access request data for the first access request and the access request data for the second access request include an access request category indicator (e.g., resource provider category code). Since the result may show that the access request category indicator does not indicate that the access request is of recurring type (e.g., "Bill Pay"), processor server computer 204 may access the recurring access request data API for code to implement an algorithm with low assurance. For example, processor server computer 204 may implement an algorithm to determine that the access request data for the first access request and access request data for the second access request indicate a same access request amount and occurred on the same day of successive months (e.g., 15$^{th}$ of May and 15$^{th}$ of June). From this information, processor server computer 204 may determine that the first access request and the second access request are likely to be recurring access requests and that resource provider computer 202 has an account on file for the user's account.

At step 5, processor server computer 204 may retrieve the changed account information. As described above with respect to step 3, the changed account information may be stored in the account information database. Processor server computer 204 may thus retrieve the changed account information from the account information database. In some embodiments, processor server computer 204 may update the account information database (or another database in communication with processor server computer 204) to include information related to the retrieval of the changed account information (e.g., date and time of retrieval, purpose of retrieval, entities to received changed account information, etc.).

At steps 6 and steps 7, processor server computer 204 may transmit the changed account information to transport computer 203 and resource provider computer 202. Resource provider computer 202 and transport computer 203 may then store the received changed account information along with an indication that the changed account information should be utilized in place of the original account information stored for the user. This may indicate to resource provider computer 202 and transport computer 203 that the account information for the user was updated and thus the changed account information should be utilized for future access requests conducted with the user. It is understood that in some embodiments, processor server computer 204 may send the changed account information to only resource provider computer 202 or only transport computer 203. In some embodiments, alert notifications may also be sent to client device 201 to indicate to the user that updated account information has been sent to resource provider computer 202. In other embodiments, the user may simply view a user interface updated by processor server computer 204 and displayed by client device 201 as described with respect to FIG. 5 in order to see that updated account information has been sent to resource provider computer 202.

At a later time, the user operating client device 201 may initiate a third access request with resource provider computer 202. Steps 3A-3H depict processing that may be performed for the third access request and may be similar to steps 1A-1H described with respect to the first access request conducted by the user. However, for the third access request shown by steps 8A-8H, resource provider computer 202 may utilize the changed account information. For example, resource provider computer 202 may generate an authorization request message and send the authorization request message including the changed account information to transport computer 203. Thus, the third access request may be conducted utilizing the changed account information associated without the user having to manually provide any information to resource provider computer 202, transport computer 203, processor server computer 204, or authorization computer 205.

While FIG. 4 shows the user conducting access requests with a resource provider associated with resource provider computer 202 for simplicity, it is understood that the user may conduct a plurality of access requests with each of a plurality of resource providers (e.g., associated with resource provider computers 22A through 22N as shown in FIG. 1). In this case, a similar process to that described with respect to flow 400 may be conducted for each of the plurality of resource provider computers. However, it is noted that certain steps may not have to be repeated when similar processes to those shown in flow 400 are performed. For example, if processor server computer 204 sends changed account information to multiple resource provider computers at the same time or in close succession, it may not have to repeat the step of determining that account information has changed for each of the plurality of resource provider computers (step 3) and retrieving changed account information (step 5).

Embodiments of the invention enable efficient use of computing resources in comparison to conventional systems. Typically, resource provider computer 202 would repeatedly query processor server computer 204 to be notified of any updates to an account. However, embodiments of the invention enable minimize the communication that takes place between processor server computer 204 and resource provider computer 202 or transport computer 203 in order to complete the process for updating account information associated with the user.

Figure 5:
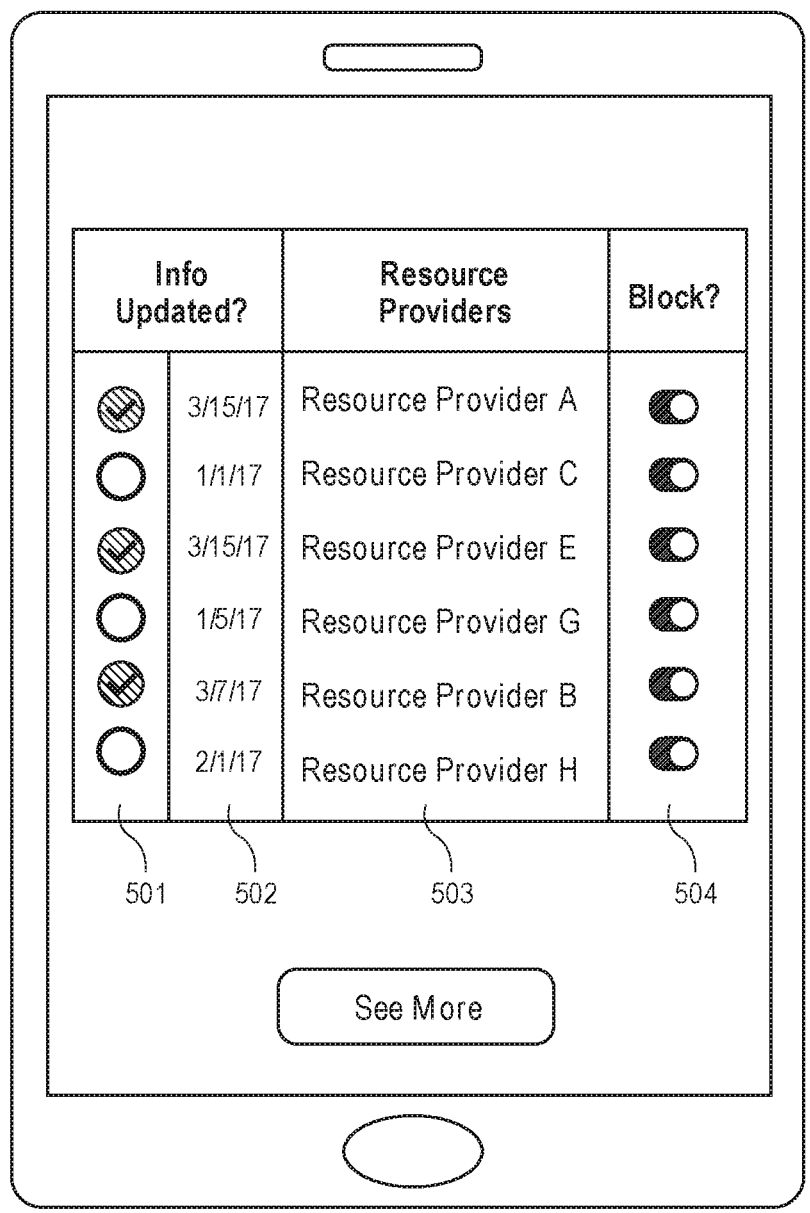
FIG. 5 shows an exemplary user interface according to embodiments of the invention.

FIG. 5 shows an exemplary user interface 500 according to embodiments of the invention. The user interface 500 may be displayed on a client device operated by the user or an authorization computer operated by an authorization entity. The user interface 500 may include update status indicators 501, update dates 502, resource provider names 503, and block switches 504. The information shown in user interface 500 may be provided by a processor server computer (similar to that described with respect to FIG. 1 and FIG. 2) on a website or application from which a user may manage their account. The exemplary user interface 500 shown in FIG. 5 depicts account information related to a single account, which may have been updated recently. While conventional systems do not enable a single platform by which a user or authorization entity can view information regarding status of updated account information, embodiments of the invention solve this issue by enabling a processor server computer to determine and provide relevant information through an interface, such as user interface 500.

Resource provider names 503 may indicate resource providers associated with resource provider computers that may store account information associated with the user. As described with respect to FIG. 4, the processor server computer may populate this list of resource provider names is various ways.

Update status indicators 501 may indicate whether account information associated with an account has been updated. For user interface 500, update status indicators 501 may indicate whether specific resource providers indicated by resource provider names 503 associated with resource provider computers have received and stored updated account information. In this exemplary case, resource providers associated with resource provider computers that have received and stored updated account information include Resource Provider A, Resource Provider E, and Resource Provider B. Resource providers associated with resource provider computers that have not yet received and stored updated account information include Resource Provider C, Resource Provider G, and Resource Provider H.

Update status indicators 501 may indicate to the user that they may have to take action in order to get the account information updated for a specific resource provider computer. In some cases, update status indicators 501 may prevent the user from attempting to conduct access requests with resource providers that may not have updated account information, so that the user does not have to waste time conducting an access request that may be unnecessarily declined. In some embodiments, the processor server computer may update user interface 500 after it has automatically sent changed account information to relevant resource provider computers (e.g., as shown in steps 6 and 7 of FIG. 4). In some implementations, update status indicators 501 may correspond to update dates 502. Update dates 502 may indicate the dates on which account information was last updated for each resource provider.

Block switches 504 may enable the user to select whether to block use of their account by a certain resource provider. The block switches 504 may be an input element of any format so that the user can indicate a selection (e.g., sliders, checkboxes, buttons, etc.). The user may easily block use of their account at one or more resource providers by activating the corresponding input element. In some cases, this may initiate a stop order at each of the selected resource providers, which may be processed by a preauthorized payment cancellation service (PPCS) to include an indication in an authorization response message that the user has requested to stop payment. While not shown in user interface 500, in some cases, the user may be able to select other options, such as to delete or pause their account for a specific resource provider.

In an exemplary, if the user wants to block use of the account with Resource Provider C, the user may click the corresponding block switch. In some embodiments, this may trigger a notification to be sent to the processor server computer to block access requests conducted between Resource Provider C and the user. In some cases, processor server computer may identify Resource Provider C by a resource provider identifier, resource provider name, or other information. As a result, when Resource Provider C attempts to conduct a recurring access request with the user's account information, the access request may be blocked. Other access requests that may not be part of a series of recurring access requests may also be blocked. This may be useful, for example, when the user wants to block another dependent user (e.g., child) from proceeding to make purchases using the user's account on file with Resource Provider C.

While FIG. 5 shows a user interface that may be displayed to the user to show information related to a single account, embodiments are not so limited. For example, the user may be associated with multiple accounts. In some embodiments, a user interface similar to the style of user interface 500 may be displayed for each account that is associated with the user. In some cases, the user interface for each account may be displayed on one screen (e.g., in a tiled format) or on separate screens (e.g., tabbed pages). This can enable the user to easily view or interact with update status indicators, corresponding resource provider names, and corresponding block switches for each account.

In another exemplary case, a user interface may be presented to the user that displays a plurality of different accounts associated with a single service provider (e.g., digital wallet provider). For example, the user interface may include update status indicators, corresponding account identification information (e.g., account issuer names), and corresponding block switches. In cases in which the user may have an account associated with multiple service providers, a user interface may be presented for each service provider on one screen (e.g., in a tiled format) or on separate screens (e.g., tabbed pages). This can enable the user to easily view or interact with update status indicators, corresponding account identification information, and corresponding block switches for each service provider.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other access requests may all be combined in some embodiments of the technology.

However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   determining, by a server computer, that access data associated with a user has changed;
   identifying, by the server computer from a plurality of access requests involving the user, a plurality of recurring access requests between a client device associated with the user and a plurality of resource provider computers that each utilize the access data; and
   responsive to said determining, automatically transmitting, by the server computer, changed access data to the plurality of resource provider computers or a plurality of transport computers associated with the resource provider computers,
   wherein the identifying the plurality of recurring access requests comprises performing, for each of the plurality of recurring access requests:
   accessing, by the server computer, a database including information related to access requests;
   querying, by the server computer, the database for data records associated with the user using at least some of the access data;
   determining, by the server computer, a set of the plurality of access requests that involve a resource provider computer from the plurality of resource provider computers based on the data records;
   detecting, by the server computer, a pattern associated with at least a portion of the set of the plurality of access requests; and determining, by the server computer, that the at least a portion of the set of the plurality of access requests are recurring access requests based on the detected pattern, and wherein the method further comprises:
   receiving, by the server computer from the client device, an indication to block use of the access data for access requests between the client device and a select resource provider computer from the plurality of resource provider computers;
   receiving, by the server computer from the client device, an access request conducted between the client device and the select resource provider computer utilizing the access data; and blocking, by the server computer, the access request.

2. The method of claim 1, wherein detecting the pattern comprises determining, by the server computer, that the at least a portion of the set of the plurality of access requests involve a recurring access request indicator.

3. The method of claim 1, wherein detecting the pattern comprises determining, by the server computer, one or more of (1) a common frequency between the at least a portion of the set of the plurality of access requests, (2) a common access request amount for the at least a portion of the set of the plurality of access requests, (3) a common day shared by the at least a portion of the set of the plurality of access requests, and/or (4) a common time shared by the at least a portion of the set of the plurality of access requests.

4. The method of claim 1, further comprising:
   sending, by the server computer, information indicating that the plurality of resource provider computers received the changed access data to the client device.

5. The method of claim 4, wherein the information indicating that the plurality of resource provider computers received the changed access data is displayed by the client device in a user interface.

6. The method of claim 5, wherein the information indicating that the plurality of resource provider computers received the changed access data includes a list of resource providers associated with the plurality of resource provider computers.

7. The method of claim 1, wherein the recurring access requests occur on a periodic or non-periodic basis.

8. A server computer comprising:
   a processor; and
   a memory element comprising code, executable by the processor, for implementing a method comprising:
   determining, by a server computer, that access data associated with a user has changed;
   identifying, by the server computer from a plurality of access requests involving the user, a plurality of recurring access requests between a client device associated with the user and a plurality of resource provider computers that each utilize the access data; and
   responsive to said determining, automatically transmitting, by the server computer, changed access data to the plurality of resource provider computers or a plurality of transport computers associated with the resource provider computers,
   wherein the identifying the plurality of recurring access requests comprises performing, for each of the plurality of recurring access requests:
   accessing, by the server computer, a database including information related to access requests;
   querying, by the server computer, the database for data records associated with the user using at least some of the access data;
   determining, by the server computer, a set of the plurality of access requests that involve a resource provider computer from the plurality of resource provider computers based on the data records;

detecting, by the server computer, a pattern associated with at least a portion of the set of the plurality of access requests; and determining, by the server computer, that the at least a portion of the set of the plurality of access requests are recurring access requests based on the detected pattern, and wherein the method further comprises:

receiving, by the server computer from the client device, an indication to block use of the access data for access requests between the client device and a select resource provider computer from the plurality of resource provider computers;

receiving, by the server computer from the client device, an access request conducted between the client device and the select resource provider computer utilizing the access data; and blocking, by the server computer, the access request.

9. The server computer of claim 8, wherein the detecting the pattern comprises determining, by the server computer, that the at least a portion of the set of the plurality of access requests involve a recurring access request indicator.

10. The server computer of claim 8, wherein the detecting the pattern comprises determining one or more of (1) a common frequency between the at least a portion of the set of the plurality of access requests, (2) a common access request amount for the at least a portion of the set of the plurality of access requests, (3) a common day shared by the at least a portion of the set of the plurality of access requests, and/or (4) a common time shared by the at least a portion of the set of the plurality of access requests.

11. The server computer of claim 8, wherein the method further comprises:

sending information indicating that the plurality of resource provider computers received the changed access data to the client device.

12. The server computer of claim 11, wherein the information indicating that the plurality of resource provider computers received the changed access data is displayed by the client device in a user interface.

13. The server computer of claim 12, wherein the information indicating that the plurality of resource provider computers received the changed access data includes a list of resource providers associated with the plurality of resource provider computers.

14. The server computer of claim 8, wherein the recurring access requests occur on a periodic or non-periodic basis.

15. The method of claim 1, wherein the access data comprises account information.

16. The method of claim 1, wherein the access request comprises a payment token or a payment account number.

17. The method of claim 1, wherein the resource provider computers are merchant computers.

18. The method of claim 1, wherein the client device is a mobile phone.

* * * * *